(12) United States Patent
Mejdrich et al.

(10) Patent No.: US 7,973,804 B2
(45) Date of Patent: Jul. 5, 2011

(54) IMAGE PROCESSING WITH HIGHLY THREADED TEXTURE FRAGMENT GENERATION

(75) Inventors: Eric Oliver Mejdrich, Rochester, MN (US); Paul Emery Schardt, Rochester, MN (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 12/045,737

(22) Filed: Mar. 11, 2008

(65) Prior Publication Data
US 2009/0231348 A1    Sep. 17, 2009

(51) Int. Cl.
| | |
|---|---|
| G06F 15/16 | (2006.01) |
| G06F 15/80 | (2006.01) |
| G06F 15/00 | (2006.01) |
| G06T 1/00 | (2006.01) |
| G09G 5/00 | (2006.01) |
| G06K 9/60 | (2006.01) |
| H04L 12/28 | (2006.01) |

(52) U.S. Cl. ........ 345/614; 345/502; 345/505; 345/418; 345/582; 370/254; 370/400; 709/201; 709/251; 712/34; 712/220; 712/241; 382/303; 382/304

(58) Field of Classification Search .......... 345/501–506, 345/519–520, 522, 538, 545, 418, 547, 581–582, 345/614, 619; 370/254, 351, 400–405; 709/201, 709/218, 238, 251; 712/28, 32, 34, 220, 712/241; 382/285, 305, 303–304
See application file for complete search history.

(56) References Cited

U.S. PATENT DOCUMENTS

| | | | | |
|---|---|---|---|---|
| 7,444,398 | B1 * | 10/2008 | Matthews | 709/224 |
| 7,594,095 | B1 * | 9/2009 | Nordquist | 712/22 |
| 2005/0203988 | A1 * | 9/2005 | Nollet et al. | 709/201 |
| 2007/0124464 | A1 * | 5/2007 | Lean et al. | 709/224 |
| 2008/0074438 | A1 * | 3/2008 | Maillot | 345/611 |
| 2009/0083263 | A1 * | 3/2009 | Felch et al. | 707/5 |

* cited by examiner

Primary Examiner — Wesner Sajous
(74) Attorney, Agent, or Firm — Wood, Herron & Evans, LLP (57) ABSTRACT

A circuit arrangement and method support a multithreaded rendering architecture capable of dynamically routing pixel fragments from a pixel fragment generator to any pixel shader from among a pool of pixel shaders. The pixel fragment generator is therefore not tied to a specific pixel shader, but is instead able to utilize multiple pixel shaders in a pool of pixel shaders to minimize bottlenecks and improve overall hardware utilization and performance during image processing.

25 Claims, 7 Drawing Sheets

IMAGE PROCESSING WITH HIGHLY THREADED TEXTURE FRAGMENT GENERATION

FIELD OF THE INVENTION

The invention is generally related to data processing, and in particular to graphical imaging processing and rendering.

BACKGROUND OF THE INVENTION

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from several drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Several alternative techniques rendering a real world three-dimensional scene onto a two-dimensional monitor using pixels have been developed based upon more realistic physical modeling. One such physical rendering technique is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing, however, is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

With continued improvements in semiconductor technology in terms of clock speed and increased use of parallelism; however, rasterization becomes viable for more complex images, and real time rendering of scenes using physical rendering techniques such as ray tracing becomes a more practical alternative to rasterization. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Hardware-based pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to be performed in any given clock cycle.

Irrespective of whether raster-based or physical rendering is performed to render image data for a scene, most rendering architectures incorporate some form of pixel fragment generator that feeds one or more pixel shaders to perform pixel shading on individual pixels in a rendered image. Pixel fragment generation refers to the partitioning of geometric primitives placed in a scene into "pixel fragments," which can represent a single pixel, a group of pixels, or even a fragment of a single pixel from primitive (e.g., where information from multiple fragments are used to generate a color for a single pixel). Pixel fragments are typically generated in a raster-based rendering pipeline using a rasterizer that rasterizes each primitive into its component fragments and outputs all of the fragments for a given primitive to one or more pixel shaders. For physical rendering techniques such as ray tracing, pixel fragment generation may be based upon collisions detected between rays and primitives placed in a scene, resulting in the output of pixel fragments to one or more pixel shaders anytime a traced ray intersects a primitive.

Pixel shading is used to apply a color to each pixel in a rendered image. Pixel shading also often incorporates texture processing, e.g., texture filtering, whereby the color applied to each pixel is based upon textures that have been mapped to one or more primitives that are displayed at a particular pixel location. Due to filtering and other operations that may be performed to paint each pixel with an accurate color, pixel shading can be a highly processor intensive operation.

Conventional rendering architectures typically rely on fixed (and fixed function) hardware-based pipelines to handle the various steps in the rendering process, and often incorporate dedicated and specialized hardware logic in various stages of the pipeline to optimize the performance of different operations required in the rendering process. In a raster-based rendering architecture, for example, a rasterizer stage of a pipeline sorts pixel fragments generated during rasterization based on screen coordinates to pixel shader pipeline elements that perform pixel operations in those screen pixel ranges. Thus, for example, four pixel shader pipeline elements might be architected into a pipeline to respectively handle the four quadrants of a rendered image.

It has been found, however, that a fixed sort of this nature based on screen coordinates, as well as the fixed number of rasterizers that may be architected into a pipeline, can become a "pinch point", or higher level pipeline bottleneck, if the amount of processing resources architected into the pipeline to handle the rasterization and pixel shading operations are insufficient to handle the desired workload. The decision of the number of rasterizers and pixel shaders, and the type of sort used to route pixel fragments to the pixel shaders, is determined at the front of the design cycle for a particular pipeline in order to target a particular performance target (usually measured in some number of triangles per second with certain visual features enabled—i.e. lit, shader, and multitextured triangles per second). As designed for a particular performance target, therefore, a conventional fixed pipeline may not operate efficiently when utilized to handle workloads that do not match the desired performance target.

Pixel shaders in conventional rendering pipelines may also rely on separate, dedicated texture units to perform texture processing. These texture units can have a relatively high latency and can stall their respective pixel shaders waiting for the texture units to complete. As a result, a pixel shader can be underutilized in some situations, and sit idle waiting on texture processing.

Conventional rendering pipelines are therefore characterized by architectures that are fixed at design time and immutable thereafter. Whether or not a particular architecture operates efficiently for a given workload can therefore vary greatly on the particular characteristics of the workload, thus limiting the flexibility and applicability of many conventional architectures for different image processing applications. A need therefore exists in the art for a more flexible image processing architecture suitable for handling a wider variety of workloads during runtime, particularly with respect to performing pixel shading operations in a rendering pipeline.

SUMMARY OF THE INVENTION

The invention addresses these and other problems associated with the prior art by providing a multithreaded rendering architecture capable of dynamically routing pixel fragments from a pixel fragment generator to any pixel shader from among a pool of pixel shaders. The pixel fragment generator, e.g., a rasterizer in a raster-based rendering pipeline, is therefore not tied to a specific pixel shader, but is instead able to utilize multiple pixel shaders in a pool of pixel shaders to minimize bottlenecks and improve overall hardware utilization and performance during image processing. In some embodiments consistent with the invention, multiple pixel fragment generators may be used, and the routing of pixel fragments may be based upon load balancing concerns and/or based upon additional concerns indicative of an optimum pixel shader for handling a particular pixel fragment, e.g., to route multiple pixel fragments from the same primitive to the same pixel shader to take advantage of texture data that is likely cached in the pixel shader as a result of processing prior pixel fragments from the same primitive. The resulting architecture provides more flexibility and wider applicability for varying workloads in different image processing applications.

Consistent with one aspect of the invention, a circuit arrangement includes hardware logic configured to host a plurality of parallel threads of execution, a pixel fragment generator configured to be executed by a thread of execution among the plurality of parallel threads of execution to generate a plurality of pixel fragment data sets for geometric objects in a scene, and a pixel shader pool including a plurality of pixel shaders, where each pixel shader is configured to be executed by a thread of execution among the plurality of parallel threads of execution to receive pixel fragment data sets from the pixel fragment generator and, for each received pixel fragment data set, process such received pixel fragment data set by applying a texture to each pixel associated with such pixel fragment data set and updating each such pixel in a frame buffer. The circuit arrangement also includes routing logic capable of routing pixel fragment data sets from the pixel fragment generator to any pixel shader in the pixel shader pool, where the routing logic is additionally configured to dynamically route each pixel fragment data set generated by the pixel fragment generator to a selected pixel shader in the pixel shader pool.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a multithreaded rendering architecture capable of dynamically routing pixel fragments from a pixel fragment generator to any pixel shader from among a pool of pixel shaders. Routing logic is disposed in one or more pixel fragment generators, e.g., a raster-based pixel fragment generator such as a rasterizer, or a physical-based fragment generator such as may be used in ray tracing or photon mapping, or alternatively disposed intermediate a pixel fragment generator and the pool of pixel shaders, or elsewhere in the rendering architecture, in order to dynamically select pixel shaders in which to process pixel fragment data sets output by each pixel fragment generator.

A pixel fragment data set includes data characterizing at least a fragment of one pixel in a rendered image. Depending upon the pixel fragment generator, pixel data may be output for only a fragment of one pixel, for one pixel, or for a group of pixels, and it will therefore be appreciated that a pixel fragment data set may describe any fraction or combination of pixels in a display. A pixel fragment data set may include, for example, data describing the coordinates of one or more pixels, as well as other contextual information such as a texture to be applied to each pixel described by the data set. As will be discussed in greater detail below, in some embodiments a pixel fragment data set may also include data that is useful in determining to which pixel shader a particular pixel fragment data set should be routed for optimal performance. For example, the parent primitive or object for a pixel fragment data set may be provided in a data set in some embodiments so that all of the pixel fragments associated with a common primitive or object are routed to the same pixel shader. As a result, if a particular pixel shader processes all of the pixel fragments for a particular primitive or object, set up operations that may be performed by the pixel shader, e.g., loading a texture from memory and storing the texture in a local cache, may be avoided when processing later pixel fragments, thus improving performance when processing the later pixel fragments. Practically any data structure and communications protocol may be used to represent a data set. In the illustrated embodiment, for example, a data set may be implemented as a message packet passed between processing elements in a software pipeline, although the invention is not so limited.

Routing logic consistent with the invention may be used to route pixel fragment data sets based on a number of factors, including, for example, load balancing concerns, e.g., to ensure that no pixel shader in the pool is overloaded while other pixel shaders remain idle. Routing logic may also be based on characteristics of the pixel fragments, e.g., the parent primitive or object therefor, the particular texture to be applied, whether a procedural or bitmapped texture is to be applied, etc., to ensure that pixel fragments are handled by the most appropriate pixel shaders for such pixel fragments.

A multithreaded rendering pipeline consistent with the invention is generally implemented using hardware logic that hosts a plurality of parallel threads of execution. A thread of execution in this context refers to a hardware-based thread, as opposed to a software-based thread, in that each thread of execution is capable of operating in parallel with other threads of execution, whether in different hardware threads in a multithreaded processor, in different cores on a multicore processor, or in different processors in a multiprocessor system, as opposed to being time-sliced on a single hardware-based thread. In the embodiments discussed hereinafter, for example, the parallel threads of execution are implemented within an interconnected set of hardware-based processing elements such as a plurality of nodes interconnected to one another in a Network On Chip (NOC) arrangement. It will be appreciated, however, that the invention may be implemented in a number of other multithreaded hardware environments without departing from the spirit and scope of the invention.

By hosting one or more pixel fragment generators and a pool of pixel shaders on a plurality of parallel threads of execution in a multithreaded hardware environment, and dynamically routing pixel fragment data sets to selected pixel shaders in the pixel shader pool, the pixel fragment generator, e.g., a rasterizer in a raster-based rendering pipeline, is not tied to a specific pixel shader, but is instead able to utilize multiple pixel shaders in a pool of pixel shaders to minimize bottlenecks and improve overall hardware utilization and performance during image processing. The resulting architecture therefore provides more flexibility and wider applicability for varying workloads in different image processing applications.

Other variations and modifications will be apparent to one of ordinary skill in the art having the benefit of the instant disclosure. Therefore, the invention is not limited to the specific implementations discussed herein.

Hardware and Software Environment

Figure 1:
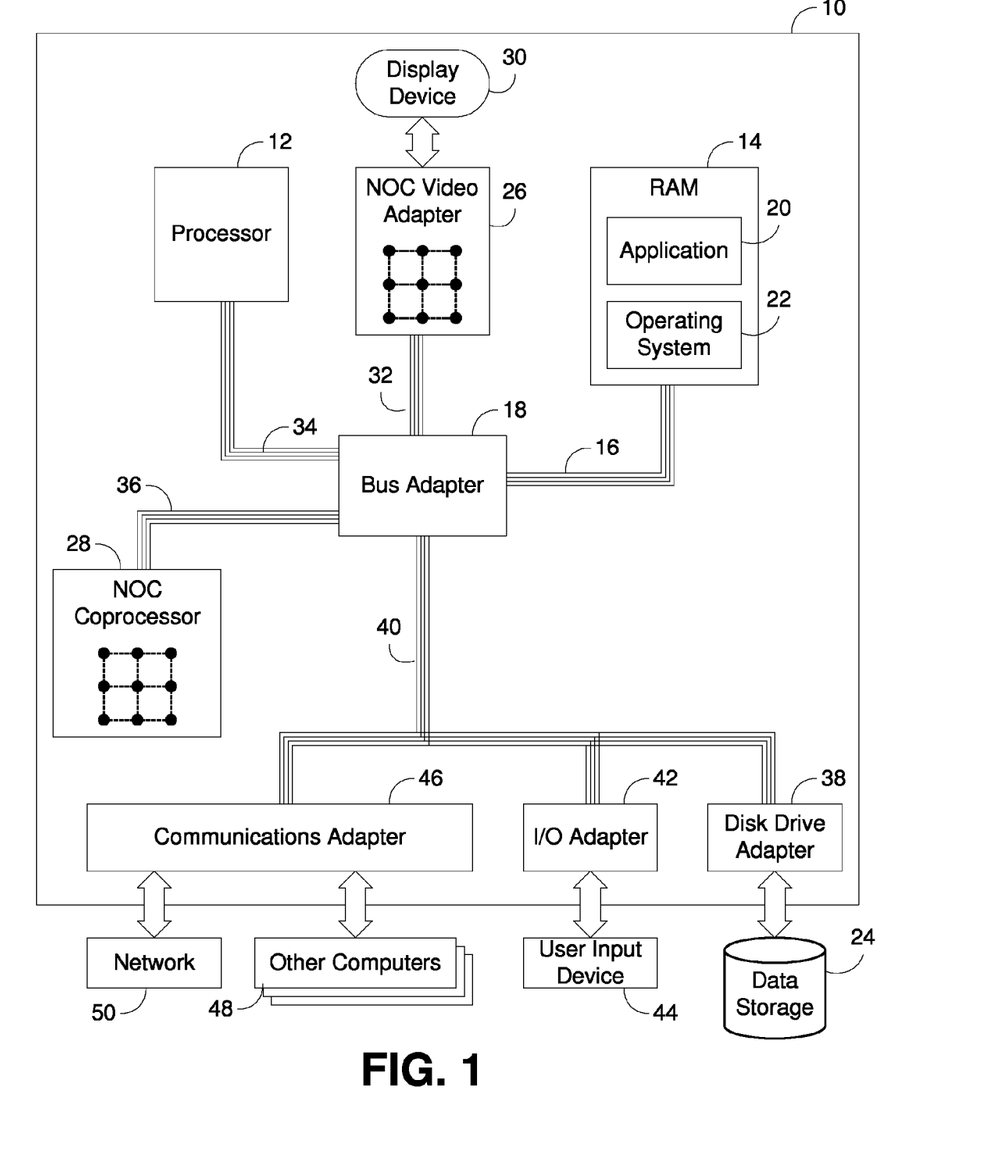
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
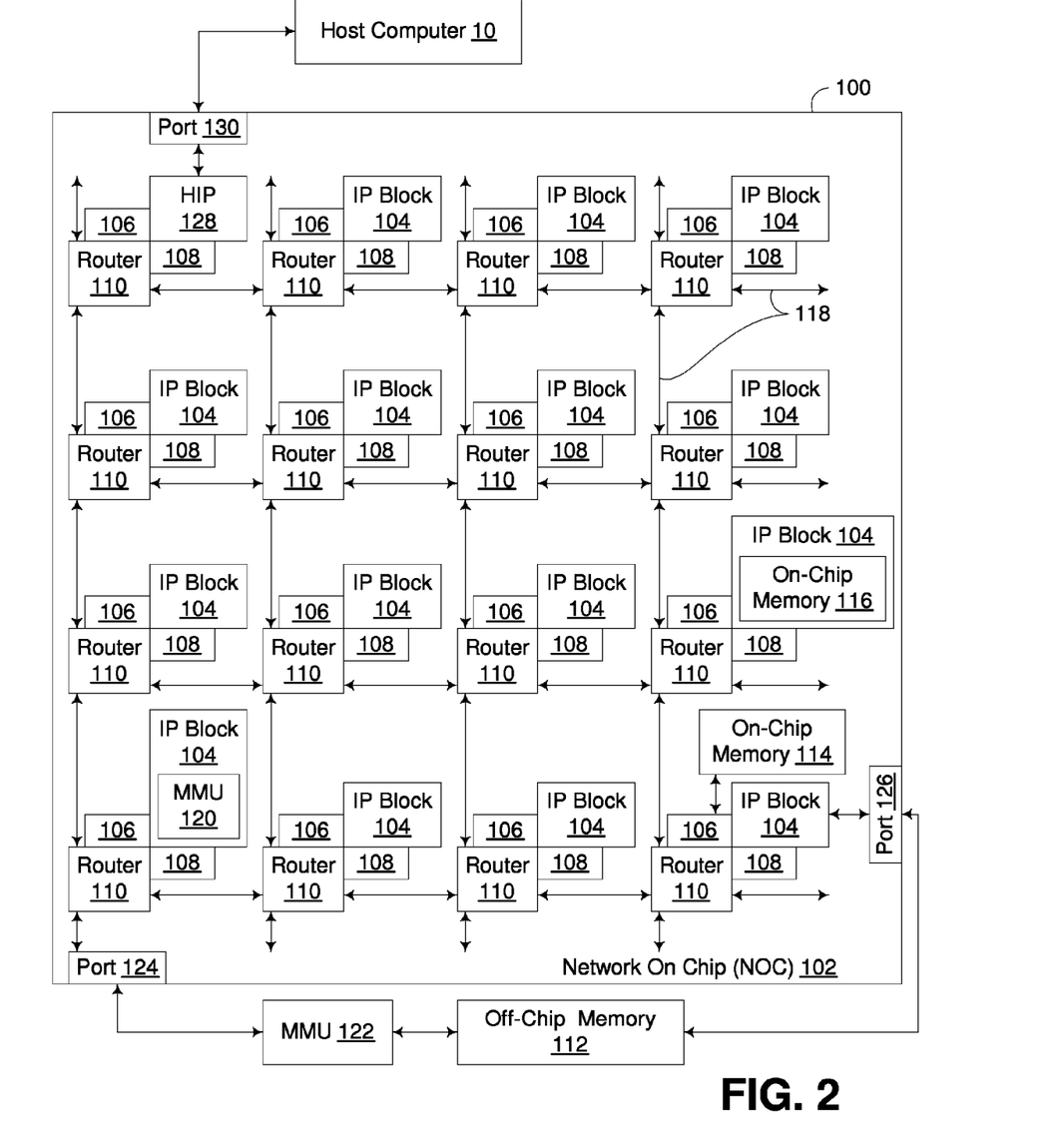
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
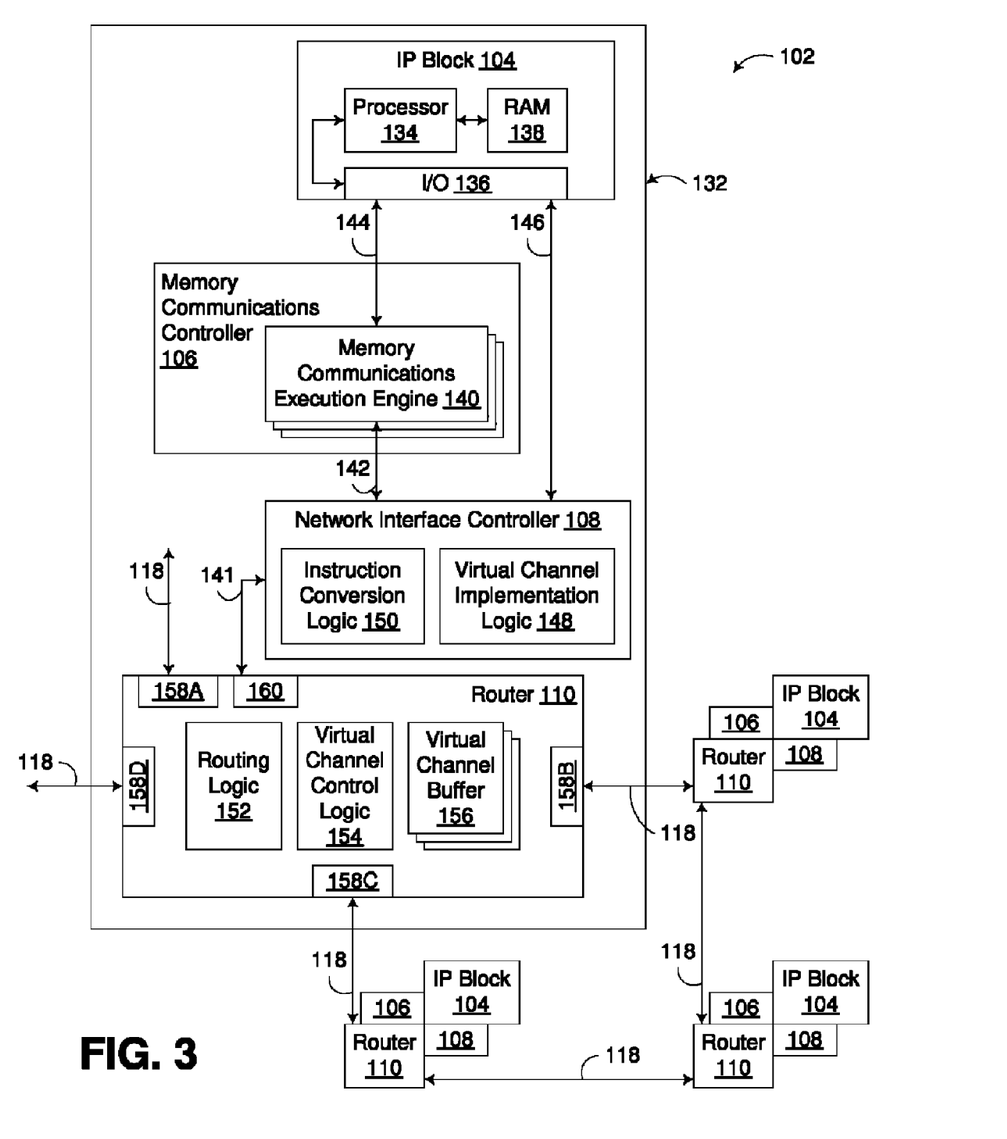
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
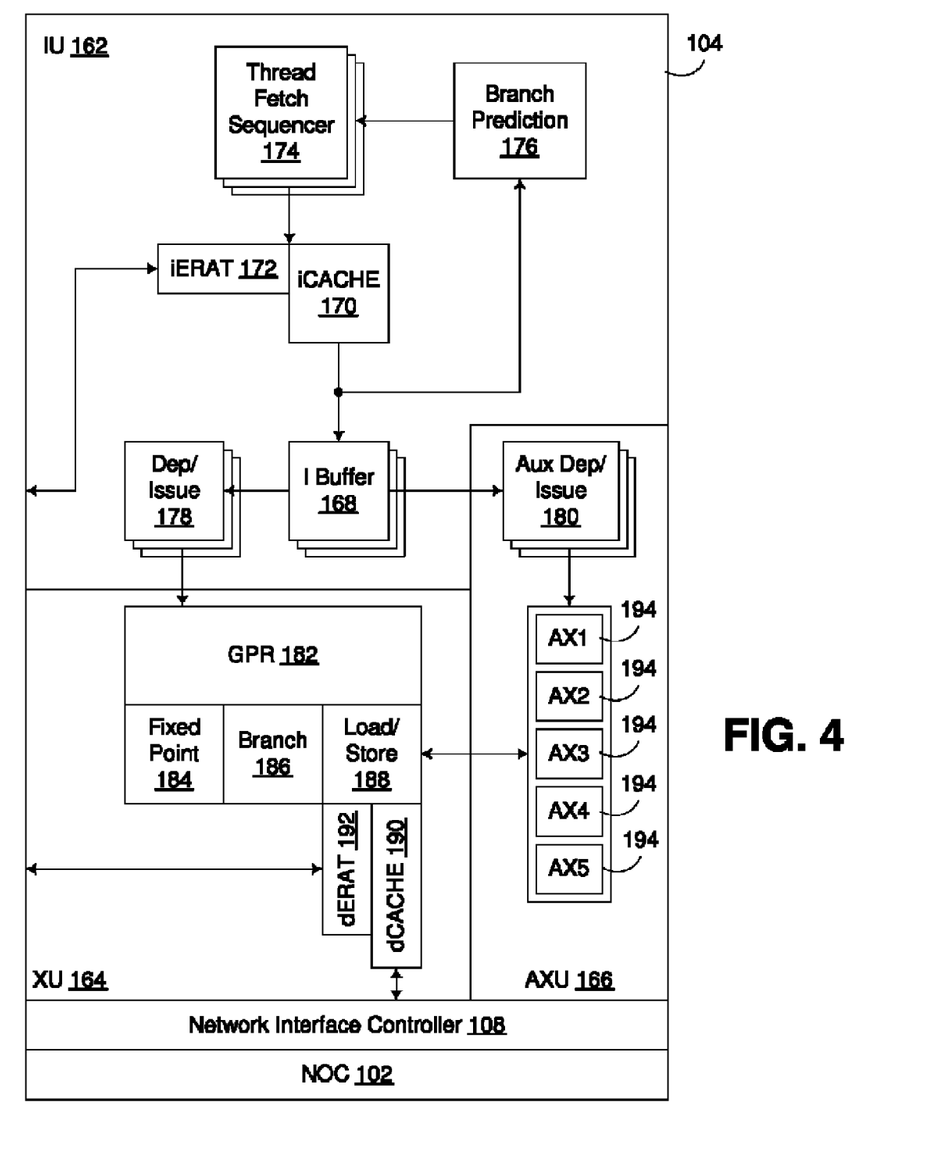
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Software Pipelining

Figure 5:
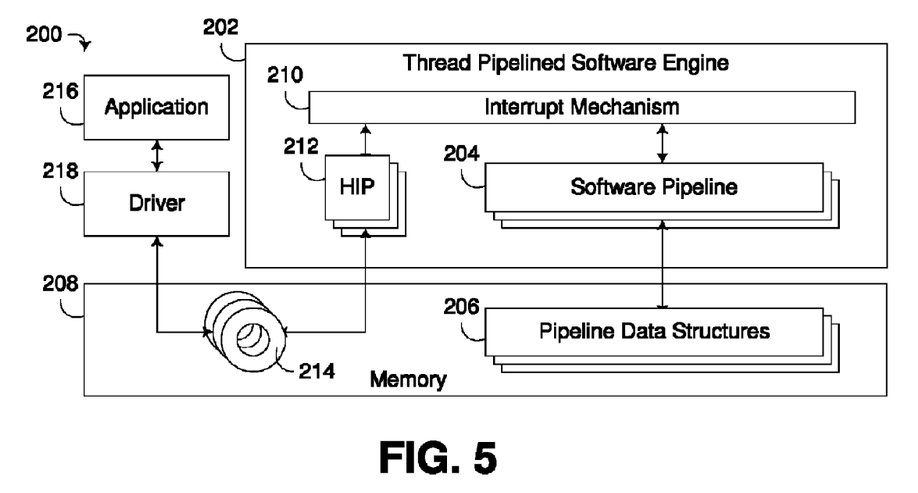
FIG. 5 is a block diagram of a thread pipelined software engine suitable for implementation in the NOC of FIG. 2.

Turning now to FIG. 5, NOC 102 may be used in some embodiments to implement a software-based pipeline. In particular, FIG. 5 illustrates an exemplary processing unit 200 incorporating a thread pipelined software engine 202 that may be used to implement and execute one or more software pipelines 204 on top of an NOC architecture. Each pipeline 204 is typically allocated one or more data structures 206 in a shared memory 208 to enable different stages of a pipeline to exchange data. Furthermore, an interrupt mechanism 210 is provided to enable stages of a pipeline to notify one another of pending work to be performed.

One or more host interface processors (HIP's) 212 are also provided in engine 202 to handle the issue of work to software pipelines 204. One or more push buffers 214 are provided to interface each HIP 212 with a software application 216 and driver 218, which are resident outside of the engine. In order to initiate work in a pipeline, a software application 216 issues requests through an appropriate driver 218 in the form of API calls, which then generates appropriate requests for the HIP and stores the requests in a push buffer 214. The HIP 212 for the relevant pipeline pulls work requests off of push buffer 214 and initiates processing of the request by the associated pipeline.

In the illustrated embodiment, and as implemented on a NOC 102, a software pipeline 204 implements a function that is segmented into a set of modules or 'stages' of computer program instructions that cooperate with one another to carry out a series of data processing tasks in sequence. Each stage in a pipeline is composed of a flexibly configurable module of computer program instructions identified by a stage ID with each stage executing on a thread of execution on an IP block 104 of a NOC 102. The stages are flexibly configurable in that each stage may support multiple instances of the stage, so that a pipeline may be scaled by instantiating additional instances of a stage as needed depending on workload. Because each stage is implemented by computer program instructions executing on an IP block 104 of a NOC 102, each stage is capable of accessing addressed memory through a memory communications controller 106. At least one stage, moreover, is capable of sending network-address based communications among other stages, where the network-address based communications maintain packet order.

The network-address based communications, for example, may be implemented using "inboxes" in each stage that receive data and/or commands from preceding stages in the pipeline, and optionally "outboxes" that buffer data awaiting output to subsequent stages in the pipeline. The network-address based communications maintain packet order, and are communications of a same type which are able to flow through the same virtual channel as described above. Each packet in such communications is routed by a router 110 in the manner described above, entering and leaving a virtual channel buffer in sequence, in FIFO order, thereby maintaining strict packet order and preserving message integrity.

Each stage implements a producer/consumer relationship with a next stage. The first stage receives work instructions and work piece data through a HIP 212, carries out its designated data processing tasks on the work piece, produces output data, and sends the produced output data to the next stage in the pipeline, which consumes the produced output data from the first stage by carrying out its designated data processing tasks on the produced output data from the first stage, thereby producing output data that is subsequently sent on to a next stage in the pipeline. This sequence of operations continues to the last stage of the pipeline, which then stores its produced output data in an output data structure for eventual return through the HIP 212 to the originating application 216.

Figure 6:
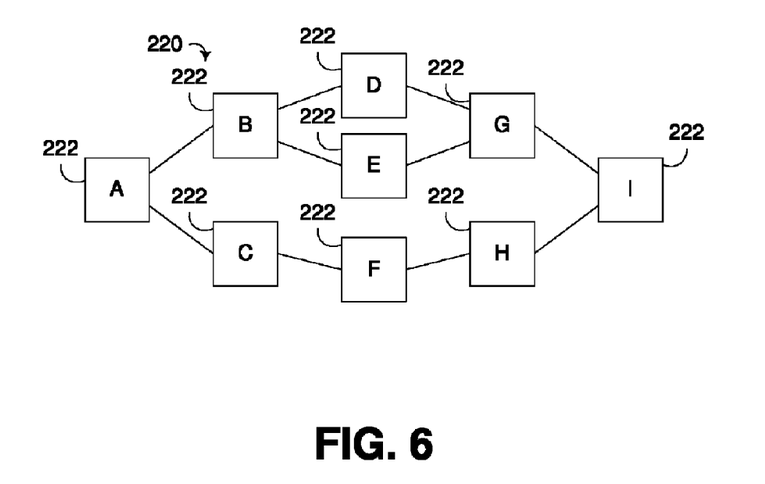
FIG. 6 is a block diagram of an exemplary software pipeline suitable for implementation in the thread pipelined software engine of FIG. 5.

The arrangement of stages in a pipeline may vary in different embodiments, as well as for performing different functions in different applications. FIG. 6, for example, illustrates an exemplary software pipeline 220 including a plurality of stage instances 222, also separately designated as instances A-I, each of which representing a thread of execution implemented on an IP block in NOC 102. The stage instances 222 are arranged in pipeline 220 into five stages, a first stage with instance A, a second stage with instances B and C, a third stage with instances D, E and F, a fourth stage with instances G and H, and a fifth stage with instance I. As can be seen from FIG. 6, instances may have a one-to-one, a one-to-many and/or a many-to-one relationship with other instances in the pipeline. Instances may operate collectively with one another in a particular stage to perform parallel tasks and share the workload, thus improving the overall throughput of the stage in performing the task. Instances in a stage may also perform different tasks from one another to enable the parallel performance of different tasks. Instances can supply data to more than one instance, while other instances may collect data and process data from multiple instances.

In the illustrated embodiment, each instance of each stage of a pipeline is typically implemented as an application-level module of computer program instructions executed on a separate IP block on a NOC, and each stage is assigned to a thread of execution on an IP block of a NOC. Each stage is assigned a stage ID, and each instance of a stage is assigned an identifier. HIP 212 (FIG. 5) typically sets up the pipeline by configuring each stage with a desired number of instances, with the network location of each instance of each stage provided to other instances of other stages to enable each instance to send its resultant workload to the proper instance in the next stage. earlier and/or later stage 3 to which an instance of stage 2 is authorized to send its resultant workload. Multiple instances may be assigned to a particular stage to provide additional processing resources relative to other stages, e.g., so work flows through the pipeline as efficiently as possible, and no single stage presents a bottleneck to performance. It will also be appreciated that workload monitoring may be performed during runtime, and that instances may be dynamically added or removed from a stage as needed for balancing the load among the stages of the pipeline.

Each stage is configured with a stage ID for each instance of a next stage, which may also include the number of instances in the next stage as well as the network location of each instance of that. Configuring a stage with IDs for instances of a next stage provides the stage with the information needed to carry out load balancing across stages. Such load balancing can be carried out, for example, by monitoring the performance of the stages and instantiating a number of instances of each stage in dependence upon the performance of one or more of the stages. Monitoring the performance of the stages can be carried out by configuring each stage to report performance statistics to a separate monitoring application that in turn is installed and running on another thread of execution on an IP block or HIP. Performance statistics can include, for example, time required to complete a data processing task, a number of data processing tasks completed within a particular time period, and so on, as will occur to those of skill in the art. Instantiating a number of instances of each stage in dependence upon the performance of one or more of the stages can be carried out by instantiating, by an HIP, a new instance of a stage when monitored performance indicates a need for a new instance.

Multithreaded Rendering Pipeline Architecture

Figure 7:
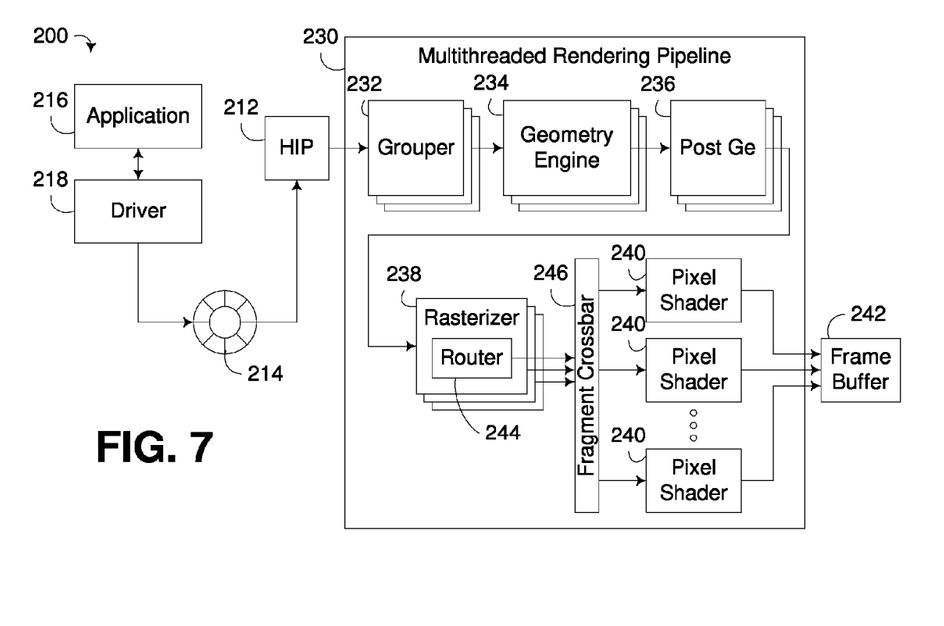
FIG. 7 is a block diagram of an exemplary raster-based multithreaded rendering pipeline consistent with the invention, and suitable for implementation in the thread pipelined software engine of FIG. 5.

Now turning to FIG. 7, this figure illustrates an implementation of processing unit 200 configured to implement a multithreaded rendering pipeline architecture consistent with the invention. In particular, FIG. 7 illustrates a multithreaded rendering pipeline 230 incorporating a grouper stage with one or more grouper units 232, a geometry engine stage with one or more geometry engines 234, a post geometry engine (Post GE) stage including one or more post GE units 236, a rasterizer stage including one or more rasterizers 238 and pixel shading stage including a plurality of pixel shaders 240. Pixel shaders 240 collectively implement a pixel shader pool, of which one or more may be defined in a particular pipeline.

Each processing element or unit 232, 234, 236, 238, 240 is desirably implemented within an IP block in a node in NOC 102, with each such unit assigned at least one dedicated hardware thread. Each unit is typically disposed on a separate node, although in other embodiments multiple units may be disposed in a single node. Moreover, each unit may be allocated multiple threads of execution in some embodiments. Time-slice based software multithreading may also be implemented in some embodiments, although it is desirable in the illustrated embodiment that multiple units not be wholly implemented on the same hardware-based thread.

Each grouper unit 232 is used to group data for streaming down the pipeline, e.g., by pulling related vertices from an object array. Each geometry engine 234 is typically used to perform object transformations and generate the geometric primitives, while each post GE unit 236 is configured to perform post processing of the geometric primitives such as perspective divides, culling, sorting, breaking up geometry, etc.

Each rasterizer 238 is configured to operate as a pixel fragment generator to generate a stream of pixel fragment data sets that characterize one pixel, a fraction of one pixel or more than one pixel from a primitive input to the rasterizer. Among other operations, each rasterizer typically performs a scan line conversion of coordinates in a primitive to (u, v) texture coordinates in a texture to be applied to the primitive. Each pixel shader 240, in turn, takes the pixel fragment data sets and applies or updates the colors of one or more pixels in a frame buffer 242, typically using texture filtering and other shading techniques. It will be appreciated that the specific operations performed by units 232, 234, 236, 238 and 240 in terms of implementing a raster-based rendering pipeline that renders image data for a scene may incorporate any number of known rendering techniques, enhancements and algorithms, and that the implementation of such techniques in the appropriate units would be well within the abilities of one of ordinary skill in the art having the benefit of the instant disclosure. It will also be appreciated that other rendering algorithms, e.g., using physical rendering techniques such as ray tracing or photon mapping, may also be implemented in a multithreaded pipeline consistent with the invention, and that such techniques may rely on different and/or additional pipeline stages not illustrated in FIG. 7. Therefore, the invention is not limited to the particular raster-based rendering pipeline architecture represented in FIG. 7.

Pipeline 230 includes dynamic routing logic, e.g., as implemented by one or more routers 244, to dynamically select, for each pixel fragment data set output by a rasterizer 238, a pixel shader 240 from among the pool of pixel shaders with which to process the pixel fragment data set. In the illustrated embodiment, a router 244 is instantiated in each rasterizer 238, such that each rasterizer 238 locally routes data sets to selected pixel shaders 240. Node ID's are assigned to data sets such that inter-node communications may be used to route data sets to selected pixel shaders. Moreover, in the illustrated embodiment, an any-to-any relationship is established between rasterizers 238 and pixel shaders 240, and as such, the inter-node communications mechanism in NOC 102 serves as a virtual fragment crossbar 246. It will be appreciated, however, that different network configurations may be used to route data sets between rasterizers and pixel shaders, and moreover, that individual rasterizers may not have access to all pixel shaders. Some pixel shaders may be assigned exclusively to certain rasterizers in some embodiments. Moreover, routing logic may be located externally from the rasterizers, e.g., in a separate unit or units in the pipeline, in other embodiments. Data sets may also be communicated via alternate mechanisms, e.g., via shared memory.

Figure 8:
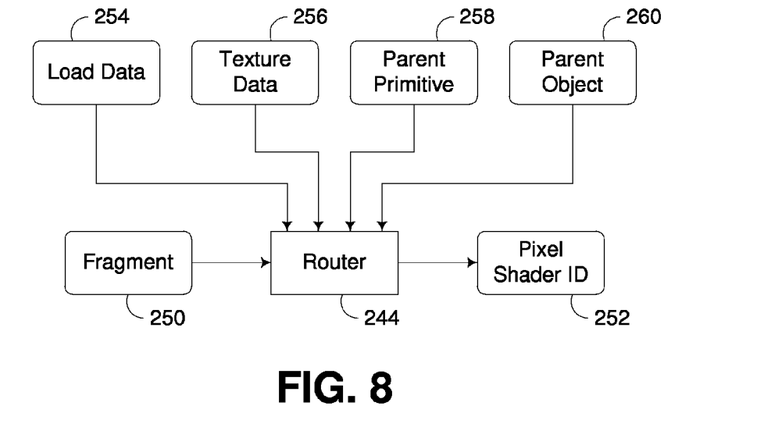
FIG. 8 is a block diagram illustrating exemplary routing logic disposed in the router referenced in FIG. 7.

Each router 244 is typically provided with node ID's for each pixel shader to which the router is able to route data sets, e.g., by a host interface processor during initialization of the pipeline. The routing logic may utilize a number of different algorithms to dynamically select and route data sets to pixel shaders. FIG. 8, for example, illustrates an exemplary fragment being input to a router 244, and the generation of a pixel shader ID 252 representing the pixel shader to which the fragment should be routed. Various types of data may be used in determining where to route a fragment. For example, as shown at block 254, the router may rely on load data, e.g., the monitored workloads of each pixel shader, in determining an appropriate pixel shader to select. Workloads may be monitored, for example, based on performance monitor counts, buffer full indications, sleep indications, network traffic, etc. In addition, any number of known load balancing algorithms, whether or not based on monitored workloads, may be used by a router, e.g., round robin or random.

In addition, in some embodiments, additional data may be used to determine an appropriate pixel shader to which a fragment should be routed. Pixel shaders may be configured as identical general purpose pixel shaders, or in the alternative, may be specialized to optimally perform different types of pixel shading operations. For example, specialized procedural texture pixel shaders could be provided in a pool with pixel shaders optimized for bitmapped textures. Pixel shaders could also be specialized to perform various functions such as bump mapping or water ripple effects. Even where all pixel shaders are identically configured, however, a benefit may still exist to routing different fragments to specific pixel shaders in order to optimize operations performed on such fragments. For example, pixel fragments that use the same texture, or that use the same type of texture (e.g., procedural or bitmapped), may be routed to particular pixel shaders to improve performance. If multiple pixel fragments point to the same texture data structure, or require the same procedural texture generation code, routing all of those pixel fragments to the same pixel shader would have a benefit for later pixel fragments, as the texture data structure and/or code would be cached locally by the pixel shader as a result of processing the earlier pixel fragments. As such, a router may rely on texture data 256 in determining where to route a pixel fragment.

Thus, for example, when at least a portion of the pixel shaders in the pixel shader pool are configured to execute or implement different pixel shading logic from one another, the routing logic may dynamically select pixel shaders to execute pixel shading logic that is suitable for efficiently processing specific pixel fragment data sets. On the other hand, when the pixel shaders in the pixel shader pool are general purpose pixel shaders that execute or implement the same pixel shading logic as one another, the routing logic may dynamically route pixel fragment data sets in order to minimize memory access latencies associated with retrieving data used by pixel shaders in processing pixel fragment data sets.

Pixel fragments can be sorted in other manners consistent with the invention, e.g., screen location (to route pixel fragments from the same stripe, tile or other screen shape) in a rendered image. Due to the dynamic nature of the routing logic, however, pixel shaders are typically not statically dedicated to specific areas of a rendered image by virtue of the virtual crossbar implemented by the routing logic.

In addition, relationships between pixel fragments may be used to route related pixel fragments to the same pixel shader. For example parent primitive data 258 and/or parent object data 260 may be accessed for each pixel fragment to route a pixel fragment to the same pixel shader used for other pixel fragments associated with the same primitive or object. The same textures are often used for all of the pixels in a primitive or object, and as such routing a pixel fragment to a pixel shader that has previously processed other pixel fragments increases the likelihood that the relevant texture data (e.g., a bitmapped texture, or procedural texture code) is already cached in the pixel shader, avoiding the need to retrieve such data from memory, and improving performance.

In some embodiments, pixel fragments, or even primitives or objects, may be tagged with routing information (e.g., a node ID for a particular pixel shader), such that the routing decision need not be made by a rasterizer, instead the router in the rasterizer simply uses the tagged information to select the pixel shader specified in the tagged information. Thus, the routing logic may dynamically route pixel fragment data sets based upon tags applied to a primitive prior to generating such pixel fragment data sets.

In addition, in some embodiments, the pool of pixel shaders may be dynamic in nature. Pixel shaders may be added or removed from the pool based upon workloads, e.g., in conjunction with allocating nodes to different stages of the pipeline to optimize pipeline performance. In combination with an any-to-any relationship between rasterizers and pixel shaders, the pipeline is readily adapted to handle different workloads and applications.

Figure 9:
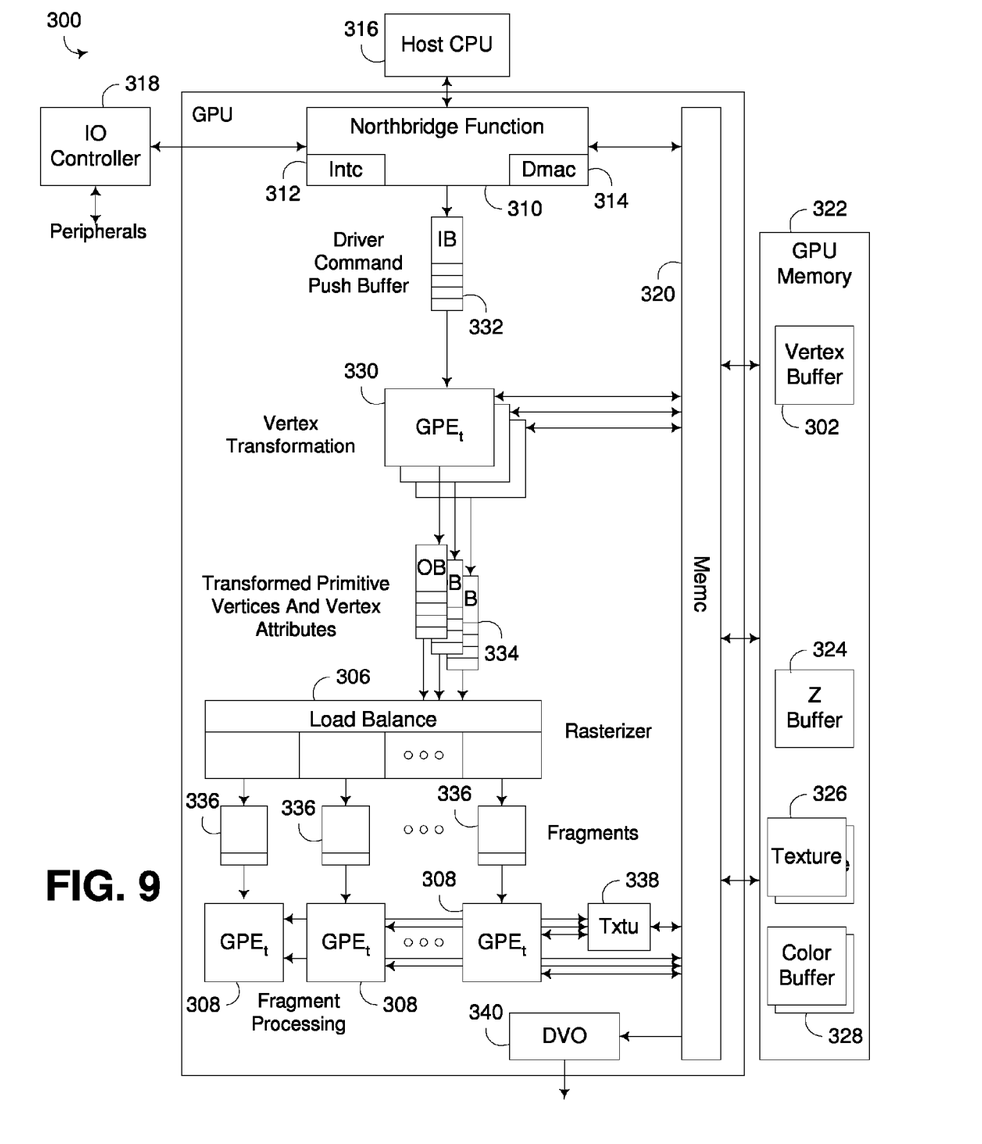
FIG. 9 is a block diagram of an exemplary implementation of a data processing system suitable for implementing a multithreaded render pipeline in a manner consistent with the invention.

FIG. 9 next illustrates another implementation of a data processing system 300 including a multithreaded rendering pipeline consistent with the invention, and specifically implemented using the software pipeline and NOC architectures described herein. With these architectures, it is possible to configure a render pipeline many times to target a particular application or rendering workload including the critical rasterization section. Any number of rasterizers can be specified that can sort into any number of pixel shaders, working on a section of user specified screen space—which can be tiles, stripes, or any other screen shape. A rasterizer can route fragments that are generated from triangle rasterization to any section of screen space (e.g., associated with a specific pixel shader) creating a virtual fragment crossbar that is controlled by software configuration at pipeline load and configuration time. In this embodiment, a rasterizer can break geometry into either single pixels or multiple pixels in an n×n grid. These pixels are then sent to any number of pixel processing threads that are wholly independent of each other. By utilizing a multithreaded processor capable of performing other parts of the graphics workload, threads can also be context switched to allow further processing.

FIG. 9 illustrates the components in data processing system 300 used to render a single vertex buffer 302 in a unified memory architecture machine. Graphics processing unit (GPU) 304 represents the software pipeline framework with a sort middle rendering taxonomy overlaid upon it. The rasterizaton stage in this embodiment (represented by load balancing unit 306) load balances the pixel fragments to multiple threads performing pixel shading or fragment processing (represented by graphics processing element threads (GPE$_t$'s) 308. In addition, through the use of frame to frame (or even intra frame) load balancing, more or less threads can be applied based on individual scene requirements.

GPU 304 is implemented using a NOC 102, and includes a northbridge function block 310 including an interrupt controller 312 and DMA controller 314. Block 310 communicates with a host CPU 316, an IO controller 318 and a memory controller function block 322 implemented in the GPU. IO controller 318 provides access to peripheral devices, while block 322 provides access to a unified GPU memory 322. Data required for the rendering process is stored in memory 322, including, for example, vertex buffer 302, as well as a Z-buffer 324, one or more textures 326 and one or more color or frame buffers 328.

Work requests to the pipeline are forwarded from host CPU 316 to an HIP implemented in block 310, which are then forwarded to one of a plurality of $GPE_t$ threads 330 implementing a vertex transformation stage of the pipeline via a driver command push buffer 332. Each thread 330 includes an associated outbox 334 that buffers transformed primitive vertices and associated vertex attributes.

A rasterizer stage including load balancing unit 306 then generates pixel fragments and outputs data sets for such pixel fragments to the pool of fragment processing pixel shader $GPE_t$ threads 308 via inboxes associated inboxes 336. Each thread 308 interacts with the data stored in memory 322 and outputs to a color buffer 328 the colors assigned to pixels in the rendered image. Each thread 328 may also rely on a texture unit 328 that retrieves from memory the textures required to implement pixel shading in each thread 308. A digital video out processor 340 outputs a digital video signal from the contents of the color buffer 328.

As such, GPU 304 is able to route, with load balancing, pixel fragments generated by the rasterizer stage to selected $GPE_t$ threads 308 in a pixel shader pool. By providing sufficient resources to the pipeline stages, and/or through adapting the allocation of resources to the various pipeline stages, pixel shading may be performed in a fast, efficient and highly parallel manner. Various additional modifications may be made to the embodiments described herein without departing from the spirit and scope of the invention. Therefore, the invention lies in the claims hereinafter appended.

What is claimed is:

1. A method of rendering image data in a software pipeline executed by a plurality of parallel threads of execution resident in an interconnected set of hardware-based processing elements, wherein the interconnected set of hardware-based processing elements includes a plurality of nodes interconnected to one another in a Network On Chip (NOC) arrangement, the method comprising:

in each of a plurality of pixel fragment generators defined in a first stage of the software pipeline, generating a plurality of pixel fragment data sets for geometric objects in a scene;

for each pixel fragment data set generated by the plurality of pixel fragment generators, dynamically selecting a pixel shader in a pixel shader pool that includes a plurality of pixel shaders defined in a second stage of the software pipeline to handle such pixel fragment data set and routing such pixel fragment data set to the selected pixel shader, wherein dynamically selecting includes load balancing across the pixel shader pool; and with each pixel shader in the pixel shader pool, processing each pixel fragment data set routed thereto by applying a texture to each pixel associated with such pixel fragment data set and updating each such pixel in a frame buffer.

2. A circuit arrangement, comprising:

hardware logic configured to host a plurality of parallel threads of execution;

a pixel fragment generator configured to be executed by a thread of execution among the plurality of parallel threads of execution to generate a plurality of pixel fragment data sets for geometric objects in a scene;

a pixel shader pool including a plurality of pixel shaders, each pixel shader configured to be executed by a thread of execution among the plurality of parallel threads of execution to receive pixel fragment data sets from the pixel fragment generator and, for each received pixel fragment data set, process such received pixel fragment data set by applying a texture to each pixel associated with such pixel fragment data set and updating each such pixel in a frame buffer; and routing logic capable of routing pixel fragment data sets from the pixel fragment generator to any pixel shader in the pixel shader pool, the routing logic configured to dynamically route each pixel fragment data set generated by the pixel fragment generator to a selected pixel shader in the pixel shader pool.

3. The circuit arrangement of claim 2, wherein the pixel fragment generator and the pixel shader pool are implemented in a software pipeline executed by the plurality of parallel threads of execution, and wherein the hardware logic includes an interconnected set of hardware-based processing elements hosting the plurality of parallel threads of execution.

4. The circuit arrangement of claim 3, wherein the interconnected set of hardware-based processing elements includes a plurality of nodes interconnected to one another in a Network On Chip (NOC) arrangement.

5. The circuit arrangement of claim 2, wherein the pixel fragment generator is among a plurality of pixel fragment generators, and wherein the routing logic enables any-to-any routing of pixel fragment data sets between pixel fragment generators and pixel shaders.

6. The circuit arrangement of claim 2, wherein at least one pixel fragment data set describes at least one pixel fragment.

7. The circuit arrangement of claim 6, wherein at least one pixel fragment data set describes a plurality of pixels.

8. The circuit arrangement of claim 2, wherein the pixel fragment generator includes raster-based pixel fragment generation functionality.

9. The circuit arrangement of claim 2, wherein the pixel fragment generator includes physical rendering-based pixel fragment generation functionality.

10. The circuit arrangement of claim 2, wherein the routing logic is configured to dynamically route pixel fragment data sets based at least in part on a load balancing algorithm.

11. The circuit arrangement of claim 2, wherein the routing logic is configured to dynamically route a first pixel fragment data set based at least in part on texture data associated with the first pixel fragment data set.

12. The circuit arrangement of claim 2, wherein the routing logic is configured to dynamically route a first pixel fragment data set based at least in part on a parent primitive associated with the first pixel fragment data set.

13. The circuit arrangement of claim 2, wherein the routing logic is configured to dynamically route a first pixel fragment data set based at least in part on a parent object associated with the first pixel fragment data set.

14. The circuit arrangement of claim 2, further comprising logic configured to dynamically add or remove a pixel shader to or from the pixel shader pool based upon a current workload of the pixel shader pool.

15. The circuit arrangement of claim 2, wherein at least a portion of the pixel shaders in the pixel shader pool are configured to execute different pixel shading logic from one another, wherein the routing logic is configured to dynamically route a first pixel fragment data set to select a pixel shader from the pixel shader pool executing pixel shading logic suitable for efficiently processing the first pixel fragment data set.

16. The circuit arrangement of claim 2, wherein the pixel shaders in the pixel shader pool are general purpose pixel shaders configured to execute the same pixel shading logic as one another, wherein the routing logic is configured to dynamically route pixel fragment data sets in order to minimize memory access latencies associated with retrieving data used by pixel shaders in processing pixel fragment data sets.

17. The circuit arrangement of claim 2, wherein the routing logic is configured to dynamically route a first pixel fragment data set based upon a tag applied to a primitive prior to generating the first pixel fragment data set.

18. An integrated circuit device including the circuit arrangement of claim 2.

19. A article of manufacture comprising a computer readable storage recording medium and logic definition program code resident on the computer readable storage recording medium and defining the circuit arrangement of claim 2.

20. A method of rendering image data in a data processing system including a plurality of parallel threads of execution, the method comprising:

in a first thread of execution from the plurality of parallel threads of execution, executing a pixel fragment generator;

in each thread among a subset of threads from the plurality of parallel threads of execution, executing a pixel shader;

with the pixel fragment generator, generating a plurality of pixel fragment data sets for geometric objects in a scene;

dynamically routing each pixel fragment data set generated by the pixel fragment generator to a selected pixel shader from among the plurality of pixel shaders; and with each pixel shader among the plurality of pixel shaders, processing each pixel fragment data set routed thereto by applying a texture to each pixel associated with such pixel fragment data set and updating each such pixel in a frame buffer.

21. The method of claim 20, wherein the plurality of parallel threads of execution are hosted by hardware logic including an interconnected set of hardware-based processing elements, wherein the interconnected set of hardware-based processing elements includes a plurality of nodes interconnected to one another in a Network On Chip (NOC) arrangement, and wherein the pixel fragment generator and the pixel shader pool are implemented in a software pipeline executed by the plurality of parallel threads of execution.

22. The method of claim 20, wherein the pixel fragment generator is among a plurality of pixel fragment generators, the method further comprising dynamically routing using any-to-any routing of pixel fragment data sets between pixel fragment generators and pixel shaders.

23. The method of claim 20, wherein dynamically routing includes dynamically routing a first pixel fragment data set based upon at least one of a load balancing algorithm, texture data associated with the first pixel fragment data set, a parent primitive associated with the first pixel fragment data set, and a parent object associated with the first pixel fragment data set.

24. The method of claim 20, wherein at least a portion of the pixel shaders in the pixel shader pool are configured to execute different pixel shading logic from one another, wherein dynamic routing includes dynamically routing a first pixel fragment data set to select a pixel shader from the pixel shader pool executing pixel shading logic suitable for efficiently processing the first pixel fragment data set.

25. The method of claim 20, wherein the pixel shaders in the pixel shader pool are general purpose pixel shaders configured to execute the same pixel shading logic as one another, wherein dynamic routing includes dynamically routing pixel fragment data sets in order to minimize memory access latencies associated with retrieving data used by pixel shaders in processing pixel fragment data sets.

* * * * *